United States Patent
Drabycz et al.

(10) Patent No.: US 8,275,214 B2
(45) Date of Patent: Sep. 25, 2012

(54) IMAGE TEXTURE CHARACTERIZATION OF MEDICAL IMAGES

(75) Inventors: Sylvia Anna Drabycz, Calgary (CA); Joseph Ross Mitchell, Calgary (CA)

(73) Assignee: Calgary Scientific, Inc., Calgary (CA)

( * ) Notice: Subject to any disclaimer, the term of this patent is extended or adjusted under 35 U.S.C. 154(b) by 602 days.

(21) Appl. No.: 12/454,286

(22) Filed: May 14, 2009

(65) Prior Publication Data
US 2009/0285462 A1 Nov. 19, 2009

Related U.S. Application Data

(60) Provisional application No. 61/071,771, filed on May 16, 2008.

(51) Int. Cl.
*G06K 9/36* (2006.01)
(52) U.S. Cl. ........ 382/276; 382/108; 382/171; 382/173; 382/280
(58) Field of Classification Search .................. 382/108, 382/171, 173, 276, 280
See application file for complete search history.

(56) References Cited

U.S. PATENT DOCUMENTS

| | | | | |
|---|---|---|---|---|
| 6,850,062 | B2 * | 2/2005 | Mitchell et al. | 324/307 |
| 7,245,786 | B2 * | 7/2007 | Mitchell et al. | 382/280 |
| 7,502,526 | B2 * | 3/2009 | Mitchell et al. | 382/280 |
| 2003/0212491 | A1 * | 11/2003 | Mitchell et al. | 702/1 |
| 2005/0253863 | A1 * | 11/2005 | Mitchell et al. | 345/582 |
| 2007/0027657 | A1 * | 2/2007 | Pinnegar et al. | 702/189 |

OTHER PUBLICATIONS

Author: R. G. Stockwell Title: A basis for efficient representation of the S-transform Date: May 19, 2006 Publisher: ScienceDirect Edition: Digital Signal Processing 17 (2007) 371-393.*

* cited by examiner

*Primary Examiner* — Arnold Kinkead
*Assistant Examiner* — Richard Tan
(74) *Attorney, Agent, or Firm* — McKeon, Meunier, Carlin & Curfman, LLC

(57) ABSTRACT

A method for texture characterization is provided. Multi-dimensional spectrum data are determined by transforming multi-dimensional image data into Fourier domain. The multi-dimensional spectrum data are partitioned into a plurality of partitions, wherein each partition is associated with a predetermined set of orthogonal voice frequencies. The partitioned multi-dimensional spectrum data are then transformed into Stockwell domain resulting in discrete orthonormal Stockwell transform data. The discrete orthonormal Stockwell transform data are then processed to determine data associated with image texture, which are indicative of a feature of the object.

27 Claims, 12 Drawing Sheets

IMAGE TEXTURE CHARACTERIZATION OF MEDICAL IMAGES

This application claims the benefit of U.S. Provisional Patent Application No. 61/071,771 filed May 16, 2008, the entire contents of which are incorporated herein by reference.

FIELD OF THE INVENTION

The instant invention relates to the field of texture analysis of medical images and in particular to a method for image texture characterization of medical images using a space-frequency transform.

BACKGROUND

Texture characterization is an important technique in medical image analysis. Image texture is defined as the spatial relationship of pixel values in an image region. In medical images, texture is associated with a local characteristic pattern of image intensity that identifies a tissue. Texture also determines local spectral or frequency content in an image. Changes in local texture causes changes in the local spatial frequency. Texture characterization is of interest in medical imaging because as biological tissues become abnormal during a disease process, their underlying textures also change.

Various techniques for characterizing image textures—including statistical; Fourier, and wavelet based techniques—have been applied to radiological images indicative of numerous pathologies such as, for example, multiple sclerosis, brain tumors, liver diseases, and malignant breast lesions, as well as normal tissues.

A texture feature is a value that quantifies a characteristic of local intensity variation within an image. A common technique for quantifying image texture used in medical imaging is based on co-occurrence matrices. Statistical measures of texture are calculated based on the frequency of specific grey levels occurring between pairs of points within an image. The co-occurrence technique has been used, for example, to classify benign and malignant solitary pulmonary nodules in Computed Tomography (CT) images and to quantify pathological changes during treatment of multiple sclerosis. However, the co-occurrence technique is limited to very small Regions Of Interest (ROIs) due to its computational complexity. Therefore, only textures associated with the highest frequencies are revealed. Broad, large-scale changes are difficult to detect using co-occurrence techniques. Furthermore, the resulting statistical measures are difficult to interpret and compare from one patient to another.

A more advanced method of texture analysis is based on discrete wavelet analysis. Wavelets provide a multi-scale representation of an image, allowing analysis of varying degrees of detail within an image. Wavelet-based texture analysis has been used for automated diagnosis and grading of breast tumor histology images.

The Stockwell-Transform (ST) is closely related to the continuous wavelet transform using a complex Morlet mother wavelet and using the ST local spatial frequency content of each pixel in an image is directly determined. The ST has been used in numerous applications such as, for example, geophysics, hydrology, and power systems analysis. The one-dimensional ST has been a useful tool for analysis of signals in medical applications such as, for example, EEG, functional magnetic resonance imaging and laser Doppler flowmetry. The ST is well suited for texture analysis of medical images due to its space-frequency resolution and for its close connection to the Fourier transform—the basis of medical image reconstruction. The ST uses complex Fourier basis functions modulated by frequency-dependent Gaussian windows. The ST preserves the phase information, uses a linear frequency scale and is easily inverted for recovering an image in the Fourier domain.

The computational complexity of the ST technique has been a main obstacle in applications of ST-based texture analysis for 2D images. Extensive processing time and large memory are used for calculating and storing the texture descriptions of 2D medical images. The 2D ST of an array of size N×N has a computational complexity of $O[N_4+N_4 \log(N)]$ and uses a storage space of $O[N_4]$. As a result, the ST of a typical 256×256 pixel MR image takes approximately 1.5 hours to calculate on a single computer and uses 32 GB of memory. Therefore, the ST-based texture analysis of 2D images has been limited to small ROIs and collapsed to one-dimensional spectra. However, small ROIs reduce the resolution of the frequency spectra and, therefore, the sensitivity to subtle texture changes, rendering the application of the 2D-ST in a clinical environment difficult and impractical. Clinical texture analysis requires a fast, efficient process that provides information about substantially all frequency components.

Despite these limitations, application of the 2D-ST has shown promising results in identifying differences in texture that correlate with neurological pathology, for example, in detecting sub-clinical abnormalities in Normal Appearing White Matter (NAWM) of multiple sclerosis patients, or in identifying brain tumors.

It is desirable to provide a method for texture characterization of image data using a 2D ST that is efficient with regard to data processing and data storage.

It is also desirable to provide a method for texture characterization of image data using rotationally invariant features of the 2D ST.

SUMMARY OF EMBODIMENTS OF THE INVENTION

Accordingly, one object of the present invention is to provide a method for texture characterization of image data using a 2D ST that is efficient with regard to data processing and data storage.

Another object of the present invention is to provide a method for texture characterization of image data using rotationally invariant features of the 2D ST.

According to one aspect of the present invention, there is provided a method for texture characterization of image data. Multi-dimensional image data indicative of an image of an object are received and transformed into Fourier domain to determine multi-dimensional spectrum data. The multi-dimensional spectrum data are partitioned into a plurality of partitions, wherein each partition is associated with a predetermined set of orthogonal voice frequencies. The partitioned multi-dimensional spectrum data are transformed into Stockwell domain to determine discrete orthonormal Stockwell transform data. Data associated with image texture are then determined in dependence upon the discrete orthonormal Stockwell transform data. The data associated with image texture, which are indicative of a feature of the object, are then provided for further processing, storage, or display.

According to another aspect of the present invention, there is further provided a storage medium having stored therein executable commands for execution on a processor. The processor when executing the commands receives multi-dimensional image data indicative of an image of an object and transforms the same into Fourier domain to determine multi-dimensional spectrum data. The processor partitions the multi-dimensional spectrum data into a plurality of partitions, wherein each partition is associated with a predetermined set of orthogonal voice frequencies and transforms the partitioned multi-dimensional spectrum data into Stockwell domain to determine discrete orthonormal Stockwell transform data. The processor then determines data associated with image texture in dependence upon the discrete orthonormal Stockwell transform data. The data associated with image texture, which are indicative of a feature of the object, are then provided by the processor for further processing, storage, or display.

The advantage of the present invention is that it provides a method for texture characterization of image data using a 2D ST that is efficient with regard to data processing and data storage.

A further advantage of the present invention is that it provides a method for texture characterization of image data using rotationally invariant features of the 2D ST.

BRIEF DESCRIPTION OF THE DRAWINGS

Exemplary embodiments of the invention will now be described in conjunction with the following drawings, in which.

DESCRIPTION OF THE PREFERRED EMBODIMENT

Figure 1:
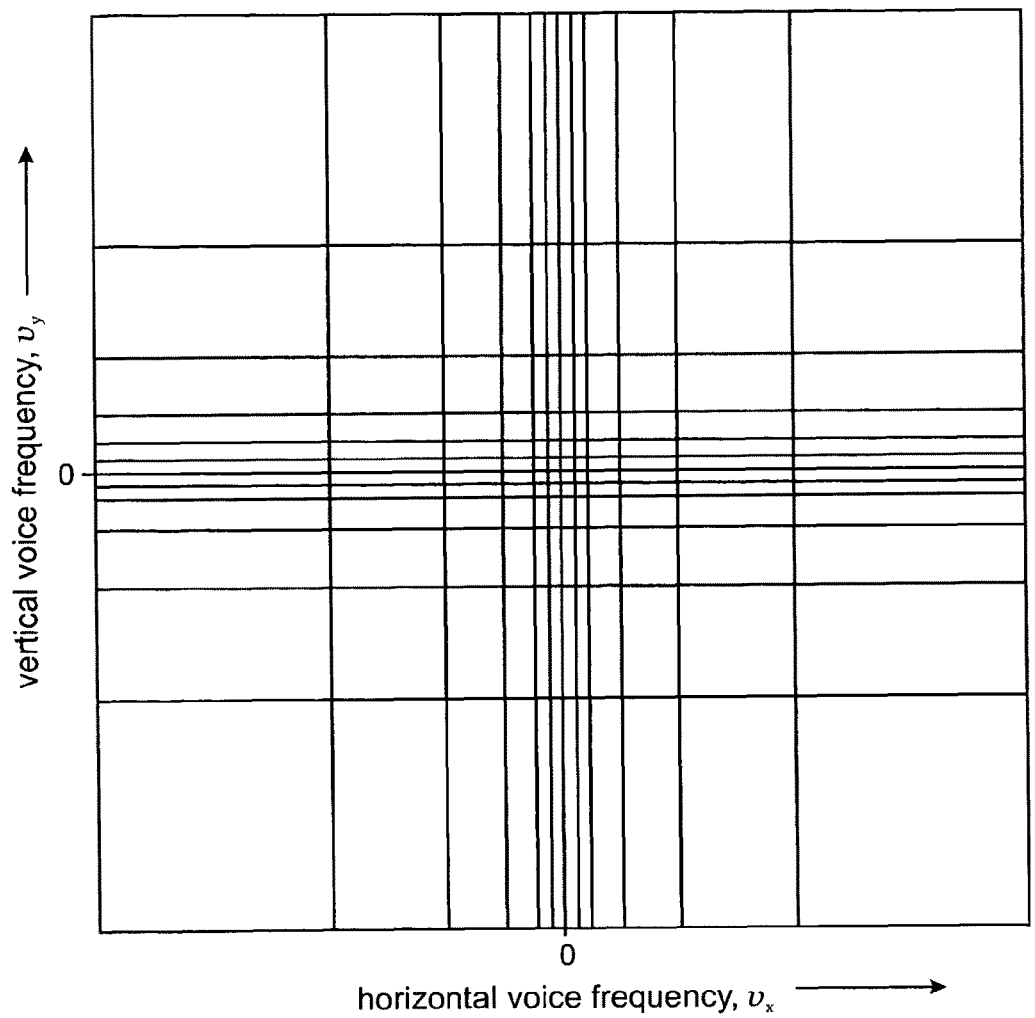
FIG. 1 is a diagram illustrating partitioning into horizontal and vertical voice frequencies according to an embodiment of a method of texture characterization of the invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

While the description of the preferred embodiment herein below is with reference to image texture analysis of medical images only for the sake of simplicity, it will become evident to those skilled in the art that the embodiments of the invention are not limited thereto, but are applicable in numerous other fields such as, for example, analysis of remote sensing data, seismic data, etc. Furthermore, while the embodiments of the invention will be described for processing 2-dimensional data, it will become evident to those in the art that the embodiments of the invention are extendable for processing of 3-dimensional data or higher dimensional data.

In the description hereinbelow mathematical terms such as, for example, maximum, minimum, etc. are used for clarity, but as is evident to one skilled in the art these terms are not to be considered as being strictly absolute, but to also include degrees of approximation depending, for example, on the application or technology.

Reference Stockwell R. G.: "A basis for efficient representation of the S-transform", Digital Signal Processing, Vol. 17, pp. 371-393, 2007, teaches accelerated calculation of the ST and reduction of redundancy in time-frequency domain by using an orthonormal basis for calculating a Discrete Orthonormal S-Transform (DOST) of a one-dimensional signal in time domain. The basis functions are determined by taking linear combinations of the Fourier complex sinusoids in band-limited subspaces, and applying phase and frequency shifts.

In a method for image texture characterization according to a preferred embodiment of the invention described hereinbelow the DOST of a two-dimensional image in the frequency domain is calculated using dyadic sampling, but is not limited thereto. The DOST provides a spatial frequency representation similar to the Discrete Wavelet Transform (DWT), but maintains the phase properties of the ST—and Fourier Transform (FT)—and the invertibility into the Fourier domain. Furthermore, the DOST enables arbitrary partitioning of the frequency domain, allowing, for example, dyadic sampling similar to the DWT for minimum redundancy, or oversampling to any extent including the fully redundant ST.

The forward 2D FT of a discrete function h[x,y] having a sampling interval of one in the x- and y-directions is defined as:

$$H[m, n] = \sum_{x=0}^{M-1} \sum_{y=0}^{N-1} h[x, y] e^{-2\pi i \left(\frac{mx}{M} + \frac{ny}{N}\right)} \quad (1)$$

and the inverse 2D FT:

$$h[x, y] = \frac{1}{MN} \sum_{m=-M/2}^{M/2-1} \sum_{n=-N/2}^{N/2-1} H[m, n] e^{2\pi i \left(\frac{mx}{M} + \frac{ny}{N}\right)} \quad (2)$$

In two dimensions, the DOST of a N×N image h[x, y]—with a sampling interval of one in each of the x-direction and y-direction—is calculated by partitioning the 2D-FT of the image, H[m,n], multiplying by the square root of the number of points in the partition, and performing an inverse 2D-FT:

$$S[x', y', v_x, v_y] = \quad (3)$$

$$\frac{1}{\sqrt{2^{p_x+p_y-2}}} \sum_{m=-2^{p_x-2}}^{2^{p_x-2}-1} \sum_{n=-2^{p_y-2}}^{2^{p_y-2}-1} H[m+v_x, n+v_y] e^{2\pi i \left(\frac{mx'}{2^{p_x-1}} + \frac{ny'}{2^{p_y-1}}\right)}$$

with $v_x=2^{p_x-1}+2^{p_x-2}$ and $v_y=2^{p_y-1}+2^{p_y-2}$ being the horizontal and vertical "voice" frequencies, respectively. The operation to create a voice image ($S[x,y,v_{x0},v_{y0}]$) comprises an inverse FT or inverse Fast Fourier Transform (FFT) of smaller dimension than N×N of the image. The spectrum is partitioned such that the wave numbers ($v_{x0},v_{y0}$) are shifted to the zero wave number point, and a $2_x^{p-1} \times 2_y^{p-1}$ inverse FFT is performed, resulting in a—in general—rectangular voice image of $2_x^{p-1} \times 2_y^{p-1}$ points, as shown in FIG. 1. The total number of points in the DOST result, and in the original image, are the same. Since the DOST is an energy-conserving transform, the forward 2-D discrete Fourier transform is applicable to each "voice" in order to reverse the spectral partitioning and reconstruct the spectrum of the image:

$$H[m, n] = \frac{1}{\sqrt{2^{p_x+p_y-2}}} \sum_{m=-2^{p_x-2}}^{2^{p_x-2}-1} \sum_{n=-2^{p_y-2}}^{2^{p_y-2}-1} S[m-v_x, n-v_y] e^{-2\pi i \left(\frac{mx'}{2^{p_x-1}} + \frac{ny'}{2^{p_y-1}}\right)} \quad (4)$$

The image is then recovered by performing an inverse FT:

$$h[x, y] = \frac{1}{N^2} \sum_{m=-N/2}^{N/2-1} \sum_{n=-N/2}^{N/2-1} H[m, n] e^{2\pi i (mx+ny)/N} \quad (5)$$

In the DOST, like the DWT, dyadic sampling (orders=0, 1, 2, ..., $\log_2 N-1$) is used. However, the two transforms provide different information about the frequency content of the image. The DWT provides horizontal, vertical, and diagonal "detail" coefficients for each order, while the DOST provides information about the voice frequencies ($v_x$, $v_y$) that contain a bandwidth of $2_x^{p-1} \times 2_y^{p-1}$ frequencies. While in the DWT the image is decomposed into "scales" of size M×M, in the DOST a minimum number of points for describing the amplitude of a Fourier frequency component in each of the horizontal and vertical directions is used. For example, a Fourier frequency component with two cycles spanning the horizontal direction and four cycles spanning the vertical direction is represented in the DOST by 4×8 points. As a result, the DOST provides more texture features for an N×N pixels image than the DWT, while maintaining an overall size of $N^2$.

Once the DOST of an image is calculated, determination of the contribution of each horizontal and vertical voice to each pixel with the image is enabled. For a predetermined set of (x, y) coordinates representing a single pixel or a an image region, the value of $S[x', y', v_x, v_y]$ is determined for the voice frequencies ($v_x$, $v_y$). Since the voice images are of varying shape and size, the value of the DOST for frequency order ($p_x,p_y$) at image location (x, y) is found at $S[x/N \times 2_x^{p-1}, y/N \times 2_y^{p-1}, v_x, v_y]$. By iterating over all values of ($p_x$, $p_y$) a local spatial frequency domain of size $2 \log_2 N \times 2 \log_2 N$ is determined for each pixel or averaged region within an image. This domain contains the positive and negative frequency components from DC—($v_x$, $v_y$)=(0, 0)—to the Nyquist frequency—($v_x$, $v_y$)=(N/2, N/2). The local spatial frequency domain—or spectrum—for a pixel (x, y) is referred to as $SL_{xy}[p_x, p_y]$. Alternatively, to the components of the spatial frequency domain is referred to in terms of the voice frequencies ($v_x$, $v_y$) instead of the frequency orders ($p_x$, $p_y$), since they are related.

It is noted that since the voice images are of size $2_x^{p-1} \times 2_y^{p-1}$, the mapping is not unique for low-frequency components of neighbouring pixels. For example, the $p_x=p_y=2$ contribution describes the low-frequency portion of the image using 4 pixels. Therefore, all pixels in a particular quadrant of the image contain the same low-frequency information.

The local frequency domain is analogous to a local two-dimensional Fourier domain—referred to as k-space. This enables determination of texture characteristics by examining the contribution of each horizontal and vertical frequency bandwidth within the image. Using the dyadic sampling, the frequency scale is linear and the bandwidths do not overlap.

Figure 2A:
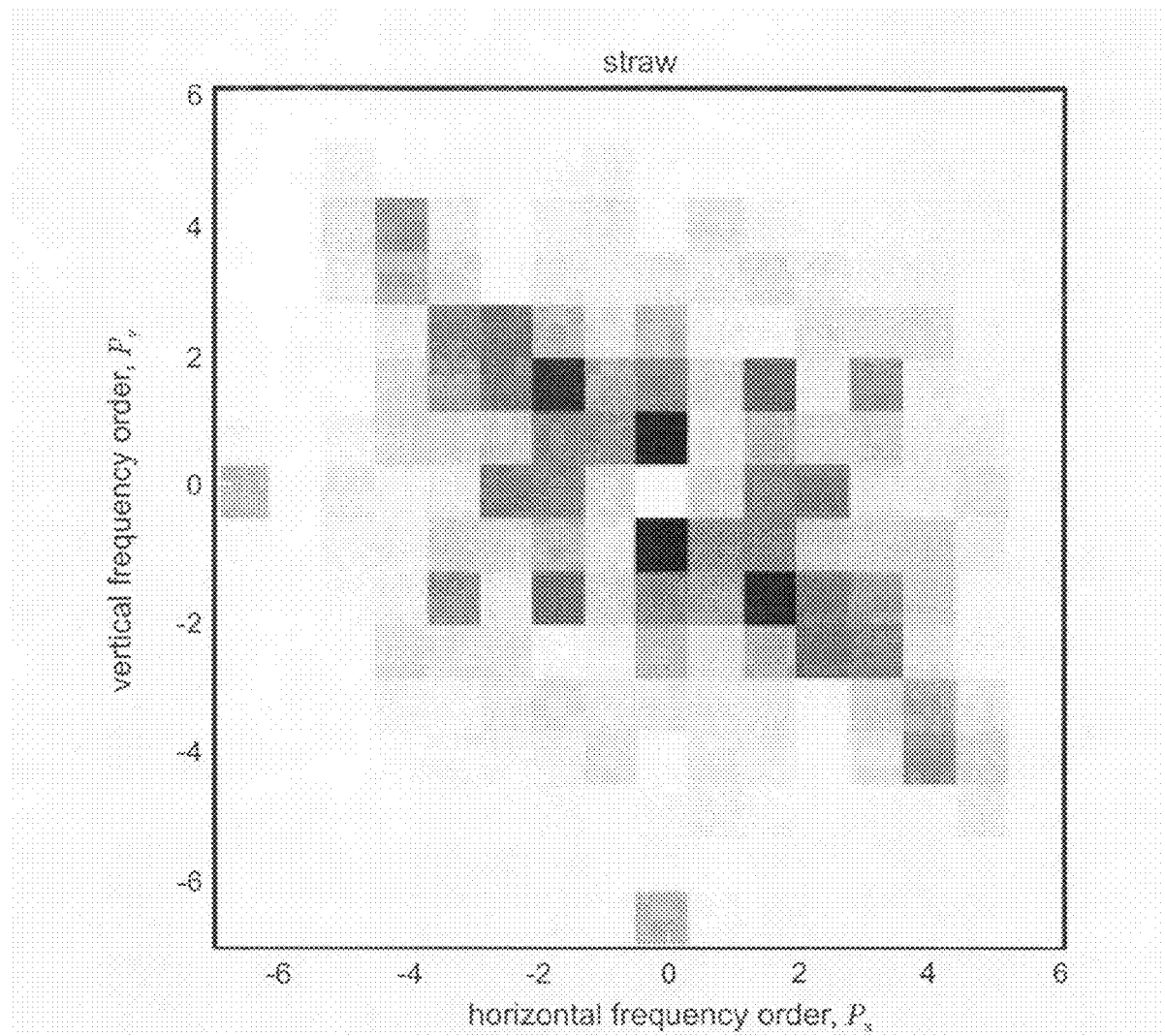
FIGS. 2a to 2d are diagrams illustrating local spatial frequency domains of images of straw, wood, sand, and grass, respectively, obtained using the method of texture characterization according to embodiments of the invention.
Figure 2B:
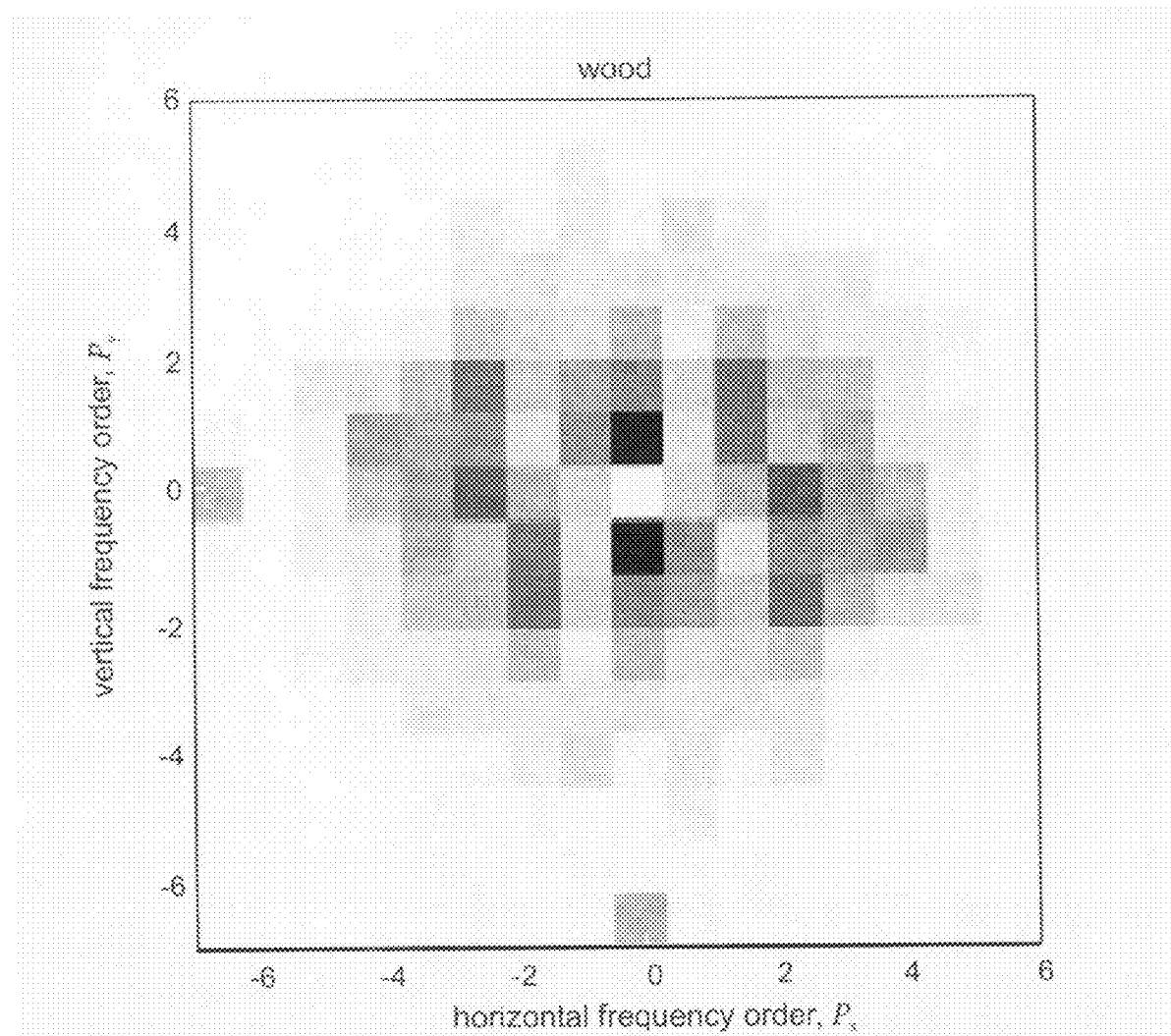
Figure 2C:
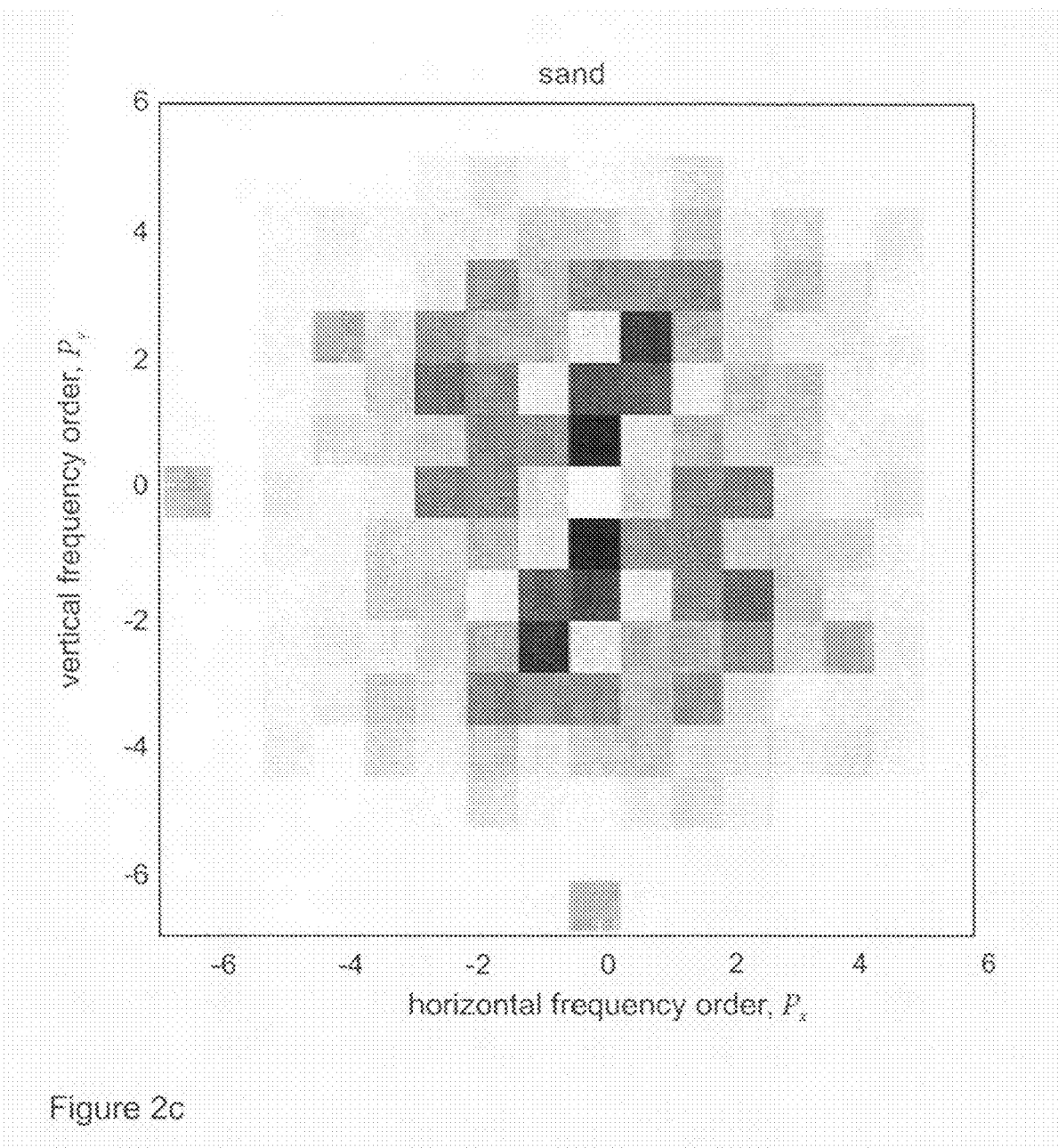
Figure 2D:
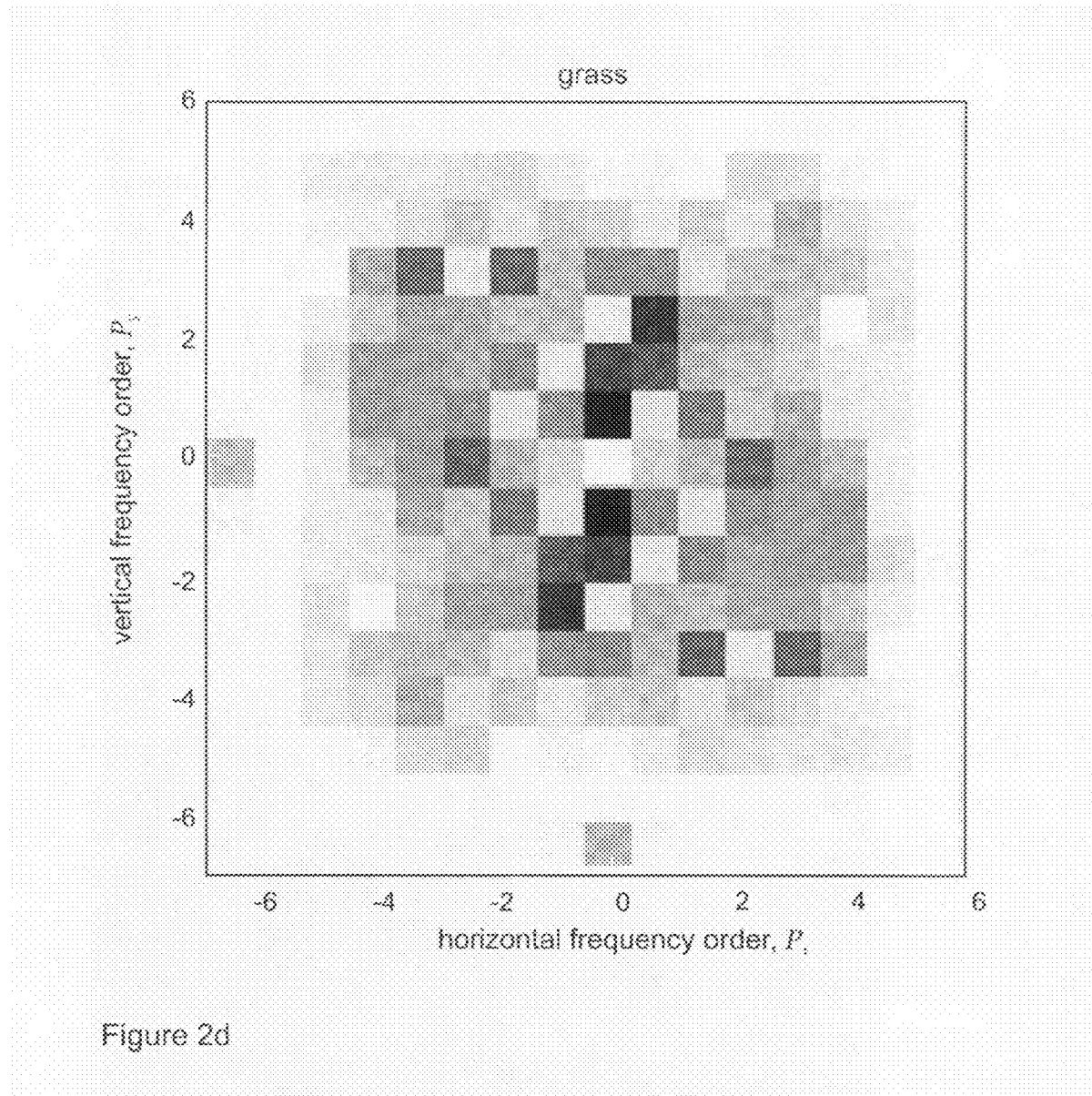

For example, FIGS. 2a to 2d illustrate the local spatial frequency domain at the centre of four texture regions from the Brodatz texture library—University of Southern California Signal & Imaging Processing Institute; USC-SIPI Image Database accessed Apr. 17, 2008. The local spatial frequency domain of straw, FIG. 2a, reflects the strong diagonal stripes present in the image. FIG. 2b shows that wood has more high frequency components oriented horizontally than vertically, while sand, FIG. 2c, and grass, FIG. 2d, have similar frequency distributions, grass having slightly more high frequency components.

To determine the most significant spatial frequency component at a predetermined point or region the "primary" or highest amplitude frequency is determined. This is done by determining the value of each voice image in the DOST at the corresponding pixel location. The value of each voice image at the location (x,y) is examined and the component with the highest amplitude is determined. The resulting ($v_x,v_y$) pair is the "primary frequency" for the pixel.

This analysis is extended to determine the primary frequency at each image pixel resulting in a value ($v_x$, $v_y$) for each location (x, y) in the image. The result is represented as a complex image, with the real portion corresponding to the primary $v_x$ value and the imaginary portion corresponding to the primary $v_y$ value. The complex image is then used to determine a magnitude image based on the radial primary frequency $v_r = \sqrt{v_x^2 + v_y^2}$, and a phase image based on the angle of orientation of the primary frequency $\theta_v = \arctan(v_y/v_x)$.

The DOST is normalized to preserve the length of the vector; like the FT it satisfies a Parseval theorem. Thus each voice is divided by the size of its partition—which attenuates the amplitude of high frequency signals when dyadic sampling is employed. To obtain a domain where the relative contribution of each partition is constant, the partition factor is removed. This provides the equivalent scaling as the original ST.

The DOST is rotationally variant because the local spatial frequency content is determined only in the horizontal and vertical directions. The result of a horizontal shift by Δx pixels and/or a vertical shift by Δy pixels results in a corresponding shift of each voice image. A circular shift of the image by Δx pixels in x and Δy pixels in y causes the phase of the FFT of the image to be multiplied by the complex value $e^{2\pi i(x\Delta x + y\Delta y)}$. The multiplied FFT is partitioned, and each partition is inverse Fourier transformed. The phase ramp applied to each partition causes it to be shifted horizontally by Δx pixels and vertically by Δy pixels when inverse transformed. The multiplication of an image by a scaling factor causes the DOST to be multiplied by the same factor, since it is a linear transform.

In case of a 90° rotation, the effect is a transpose, or a switching of the x and y values in the image and a reversal of the y coordinate. As a result, each voice has the x and y coordinates switched and the y coordinate reversed. Similarly, for a 180° rotation, the effect is to reverse the y coordinates and to maintain the x coordinates. The result in the DOST is to reverse the y coordinates of each voice image, while the x coordinates are not affected. In case of rotations of 0<θ<90°, the effect is more complicated. A rotation of the image implies a rotation of its FT. Therefore, when calculating the 2D DOST of a rotated image, the partitioning grid is applied to the rotated Fourier transform. As a result, the frequency components are rotated into different partitions.

To obtain rotationally invariant features from the DOST, the magnitude of diagonally opposite values—the horizontal and vertical frequency information are averaged for each order and diagonal elements of the DOST where $p_x=p_y$ are excluded. By combining the horizontal and vertical frequency information for the entire DOST a rotationally invariant domain describing the entire image is obtained.

Figure 3:
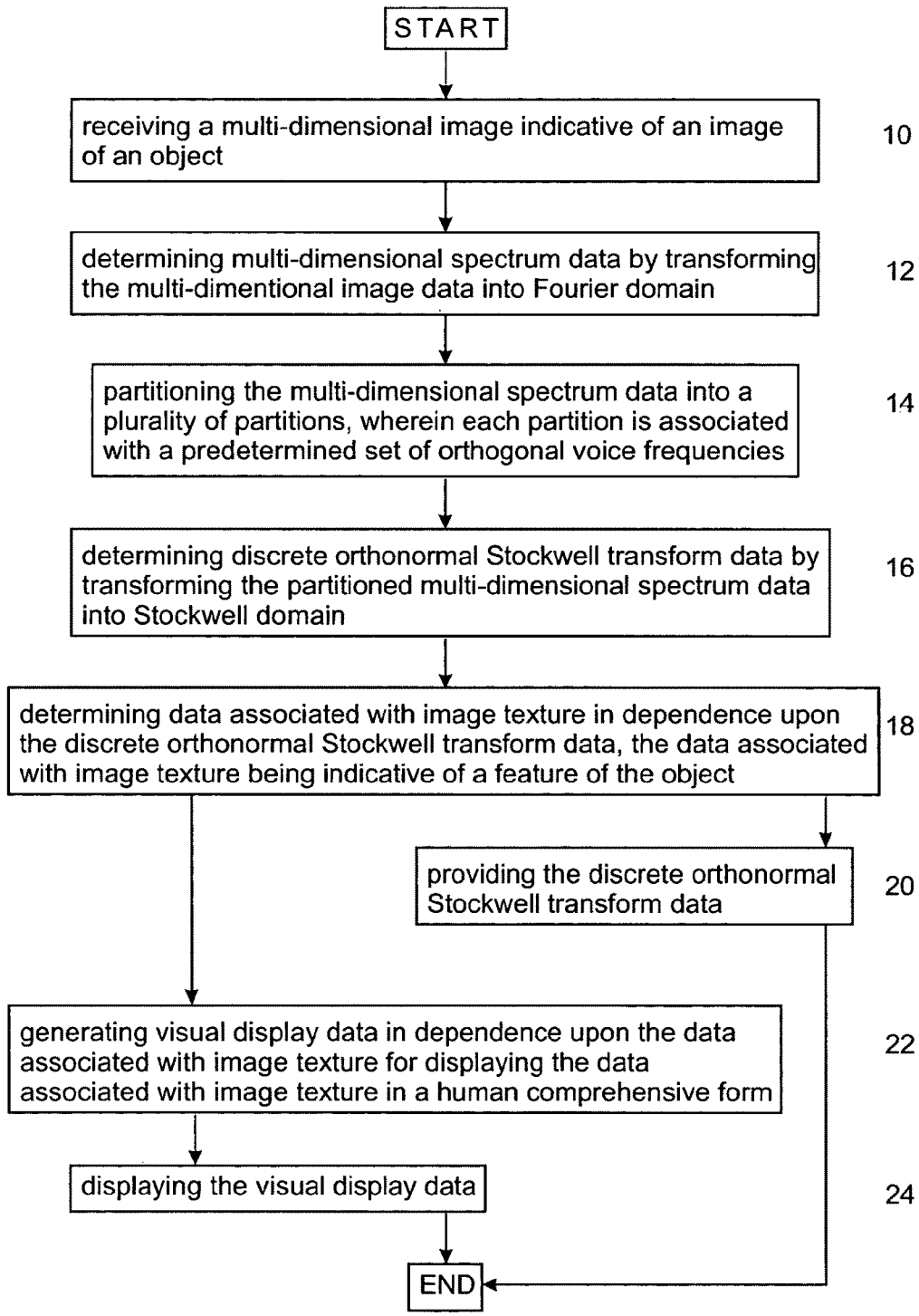
FIG. 3 is a simplified flow diagram of a method for texture characterization according to embodiments of the invention.

Referring to FIG. 3, a flow diagram of a method for texture characterization according to the preferred embodiment of the invention is shown. At 10, multi-dimensional image data indicative of an image of an object are received. The multi-dimensional image data are then transformed into. Fourier domain—12—for determining multi-dimensional spectrum data. At 14, the multi-dimensional spectrum data are partitioned into a plurality of partitions, wherein each partition is associated with a predetermined set of orthogonal voice frequencies. The partitioned multi-dimensional spectrum data are then transformed into Stockwell domain—16—resulting in discrete orthonormal Stockwell transform data. At 18, data associated with image texture, and indicative of a feature of the object, are determined in dependence upon the discrete orthonormal Stockwell transform data. At 20, the data associated with image texture are provided, for example, for storage or further processing. Optionally, visual display data in dependence upon the data associated with image texture are generated for displaying the same in a human comprehensible form—22—and displayed—24.

The step 18 comprises various different processing steps of the discrete orthonormal Stockwell transform data, which are chosen, for example, depending on the application, the type of image data, and the features to be revealed. Examples are analysis of medical images such as MR images or CT images for revealing tumors or lesions. As is evident, the method for texture characterization according to embodiments of the invention is not limited thereto, but also applicable in numerous others applications such as, for example, remote sensing and seismic analysis. Examples of processing steps 18 are:
determining voice image data in dependence upon frequency information in a predetermined band in dependence upon the discrete orthonormal Stockwell transform data corresponding to a respective partition;
determining spectrum data indicative of a spectrum of the image in dependence upon the discrete orthonormal Stockwell transform data corresponding to the plurality of partitions;
determining image data in space domain by inverse Fourier transforming the spectrum data;
determining spectrum data indicative of a spectrum of the image by Fourier transforming the discrete orthonormal Stockwell transform data corresponding to pre-selected partitions of the plurality of partitions;
determining local spatial frequency domain data in dependence upon the discrete orthonormal Stockwell transform data;
determining local spectrum data for one of a predetermined location and region within the image in dependence upon the discrete orthonormal Stockwell transform data;
determining primary frequency data in dependence upon the local spectrum data;
determining complex image data in dependence upon the discrete orthonormal Stockwell transform data;
determining magnitude image data in dependence upon the complex image data; determining phase image data in dependence upon the complex image data; and,
determining rotationally invariant image texture data in dependence upon the discrete orthonormal Stockwell transform data.

Figure 4:
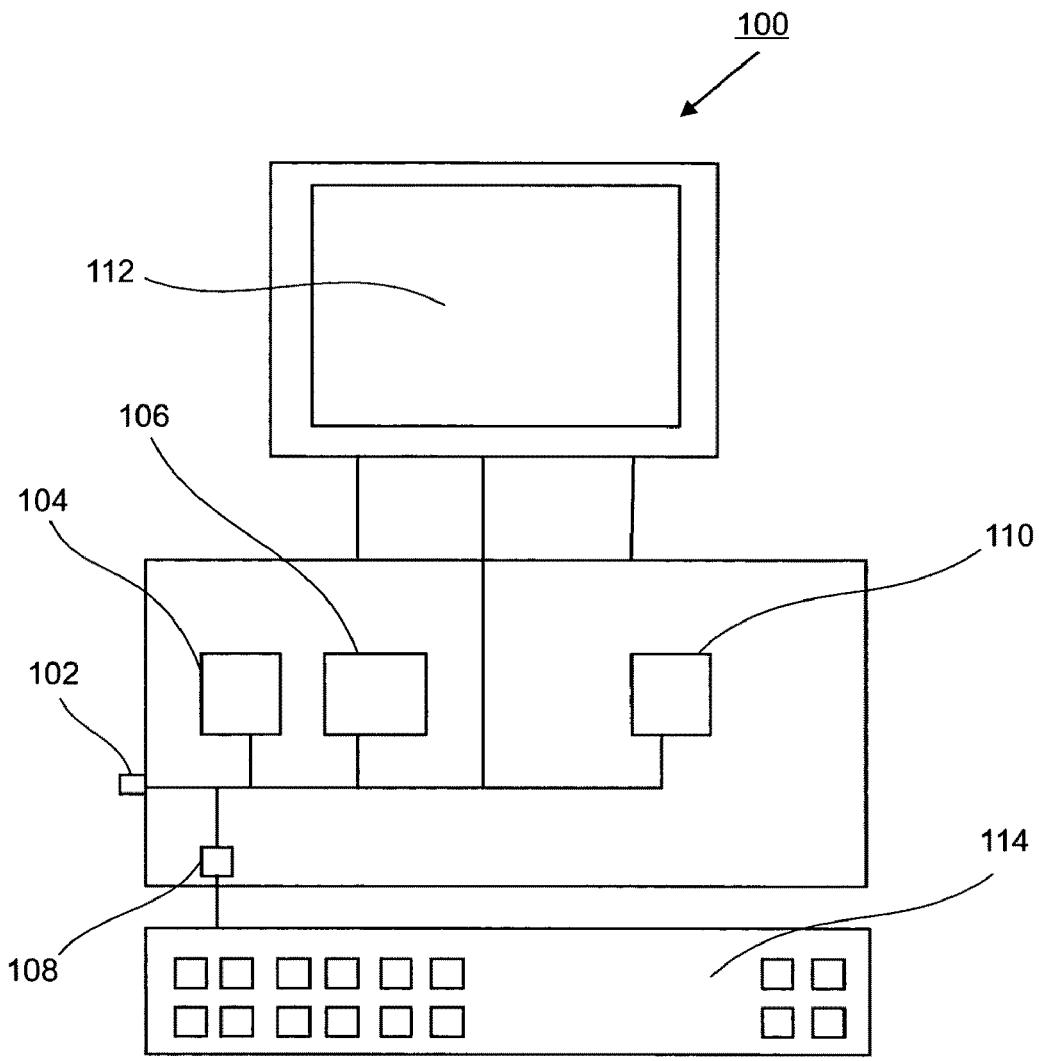
FIG. 4 is a simplified block diagram of a processing system according to embodiments of the invention for implementing the embodiments of the method for texture characterization shown in FIG. 3.

Referring to FIG. 4, shown is a processing system 100 according to a preferred embodiment of the instant invention, for implementing the above embodiments of the method for texture characterization. Multi-dimensional image data are received at input port 102. Using electronic circuitry such as a processor 104 the data are then digitally processed. The system 100 comprises a storage medium 110 having stored therein executable commands for execution on the processor 104 for performing the processing corresponding to the above method for texture characterization according to embodiments of the invention. Alternatively, the processor 104 comprises electronic circuitry designed for performing at least a portion of the processing in a hardware implemented fashion. The system 100 further comprises memory 106 such as RAM in communication with the processor 104 for storing data during execution. The processing is controlled by a user viewing, for example, a graphical representation of the data and by providing control commands via port 108—connected, for example, to a keyboard 114 to the processor 104. Optionally, the display 112 is a graphical user interface facilitating user interaction during processing. Optionally, the system 100 is a retrofit of an existing image processing system and the method for texture quantification according to embodiments of the invention is implemented, for example, as executable commands provided to the processor 104 of the system 100 from a storage medium or as a hardware component for incorporation into the system 100.

The performance of the DOST used in the method for image characterization according to the preferred embodiment of the invention has been investigated for 2D image data. The investigations and the results are presented hereinbelow.

To determine the frequency response of the 2D-DOST, the Point Spread Function (PSF) was calculated. This was done by creating a "delta" image—a 256×256 image where the pixel at location (128,128) had a value of one, and all other pixels had a value of zero—followed by taking the 2D DOST of the delta function and determining of the local spectrum. Furthermore, the average time to calculate the DOST and amount of memory used were determined for randomly generated N×N images, where N varied from 4 to 1024, and compared to time and memory used for the ST. The calculations were based on the calculation of real images, where only half of the space-frequency domain is calculated and stored due to Hermitian symmetry.

The accuracy of the DOST inversion was tested by taking the DOST of Brodatz texture images and then inverting the 2D DOST domain according to equations (4) and (5). The $L_1$ norm between each inverted image, $s_1$, and the original, $s_0$ was then determined as:

$$L_1 = \frac{1}{N^2}\sum_{i=1}^{N}\sum_{j=1}^{N}|s_1(i,j)-s_0(i,j)| \tag{6}$$

To determine changes in local DOST frequency domains with varying levels of noise, a series of synthetic images with known frequency content and added noise were evaluated. By varying both of these factors, the smallest change in spatial frequency, and contrast, that are reliably detectable was determined. The two factors are related, i.e. high spatial frequencies are more reliably detected in images with a high contrastto-noise ratio. The relationship between contrast and maximum detectable frequency is similar to the modulation-transfer-function used to characterize imaging systems, and provides a characterization of the 2D-DOST.

A series of images of size 256×256 with a single frequency component were generated by varying the frequency of a sinusoid of wave number k=1, 10, 20, . . . , 120, oriented either horizontally or diagonally, or both with equal components horizontally and vertically, with a minimum value of −1.0 and a maximum of +1.0. Various levels of Gaussian noise with standard deviation σ=0.1, 0.2, . . . , 1.0 were added resulting in a total of 260 test images—13 frequencies×2 orientations× 10 noise levels.

To determine the effect of the varying frequency and noise, the signal-to-noise ratio (SNR) of the local DOST spectrum, $S_{x,y}(p_x,p_y)$, for the central 5×5 pixels in each image was determined. The SNR was defined in units of decibels (dB) as the amplitude of the frequency component being analyzed divided by the root mean square amplitude of the rest of the domain values:

$$SNR(\text{dB}) = 20\log_{10}\left(\frac{A_{signal}}{A_{noise}}\right) \quad (7)$$

where $A_{signal}$ is the amplitude of the voice frequency contained in the noise-free image in the local spectrum at the central pixel, $$A_{signal} = S_{128,128}[p_x,p_y] \quad (8)$$

and $A_{noise}$ is the RMS amplitude of the remaining frequency components, not present in the noise-free image, but introduced with the addition of Gaussian noise, $$A_{noise} = \sum_{\substack{i=0 \\ i \neq p_x}}^{\log_2 N} \sum_{\substack{j=0 \\ j \neq p_y}}^{\log_2 N} \sqrt{\frac{S_{128,128}[i,j]}{(\log_2 N)^2 - 2}} \quad (9)$$

The accuracy of the primary frequency determination was analyzed by determining the fraction of image pixels that were correctly classified in the single-frequency images. For this analysis a 10×10 pixel region in the centre of the image—or 100 test pixels per image resulting in a total of 26,000 pixels—was used. For each pixel within the central 10×10 region, the primary frequency as found by the 2D-DOST was recorded and compared to the true frequency of the image. The number of misclassifications was then recorded.

To test the ability of the rotation-invariant DOST to classify textures, 9 images from the Brodatz texture library—grass, straw, herringbone weave, woolen cloth, pressed calf leather, beach sand, wood grain, raffia, and pigskin—were used. It was tested the ability of the invariant DOST spectra to classify the images when: (1) trained and tested on non-rotated images; (2) trained on rotated and tested on non-rotated images; and, (3) trained and tested on a variety of angles. Multiple sub-images from each 512×512 texture image were extracted with each sub-image being of size 64×64 pixels. The invariant DOST spectrum was then determined for each sub-image.

The classification results using the DOST were then compared to those obtained using the invariant wavelet transform described in Porter R, Canagarajah N: "Robust rotation-invariant texture classification: wavelet, Gabor filter and GMRF based schemes", IEEE Proc Vis Image Signal Process, Vol. 144, pp. 180-188, 1997.

In a first case, 64 sub-images of size 64×64 from each texture oriented at 0° were extracted. The classifier was trained on 56 sub-images of each texture—56 images×9 textures=504 total—and the classification tested on 8 sub-images of each texture—8 images×9 textures=72 total. In the second case, the ability of the DOST and wavelet methods to classify images oriented at a different angle than the classifier was trained on was tested. For this experiment texture images oriented at angles: 0°, 30°, 60°, 90° and 120° were extracted, i.e. 25 sub-images of size 64×64 pixels from each 512×512 image at each angle—25 sub-images×5 angles×9 textures=1125 images in total, and the invariant DOST spectrum as well as the invariant wavelet spectrum were calculated for each image. The classifier was trained on the DOST spectra from the 25 sub-images at angles 30°, 60°, 90° and 120° degrees—25 sub-images×4 angles×9 textures=900 images—and tested on the 0° images—25 sub-images×1 angle×9 textures=225 images. Finally, the classifier was trained on the DOST spectra from 20 sub-images of each texture at angles 0°, 30°, 60°, 90°, and 120°—20 sub-images×5 angles×9 textures=900 images—and tested on 5 images of each texture at each angle—5 sub-images×5 angles×9 textures=225 images.

The analysis was performed on a 2.4 GHz Intel Core 2 Duo with 2 GB of RAM on Mac OS X 10.5.

Figure 5A:
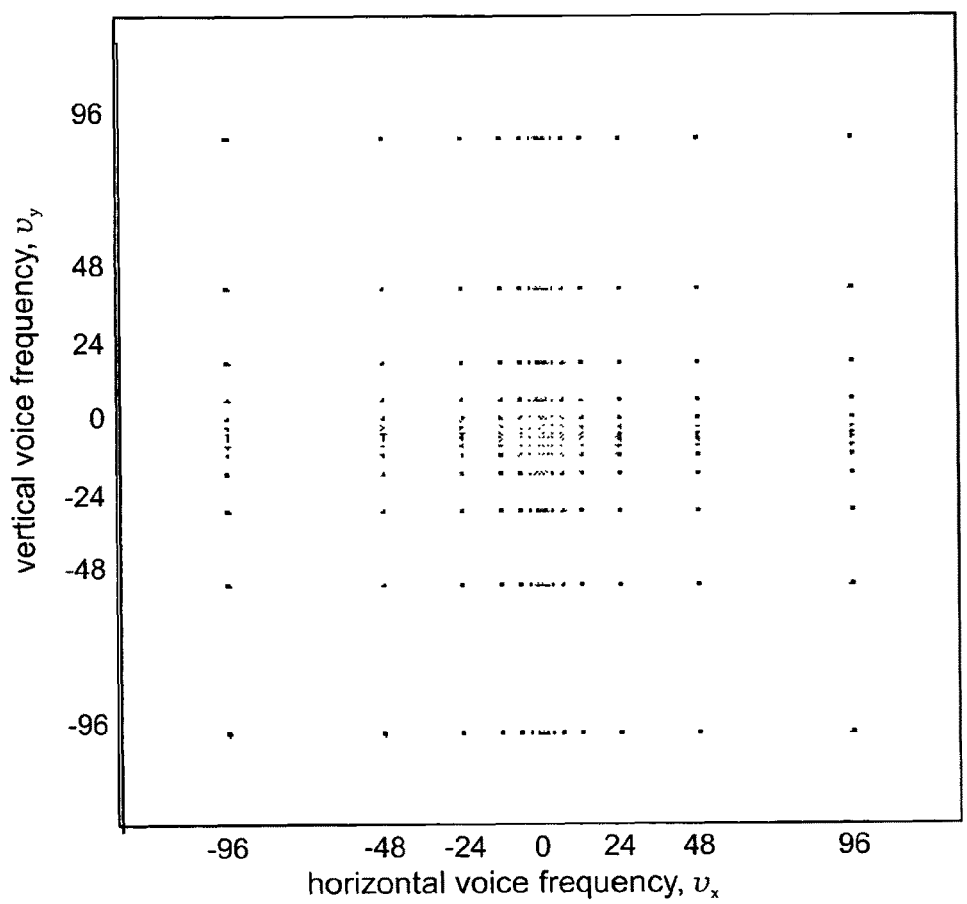
FIGS. 5a and 5b are diagrams illustrating a 2D discrete orthonormal Stockwell transform of a delta function obtained using the method of texture characterization according to embodiments of the invention.
Figure 5B:
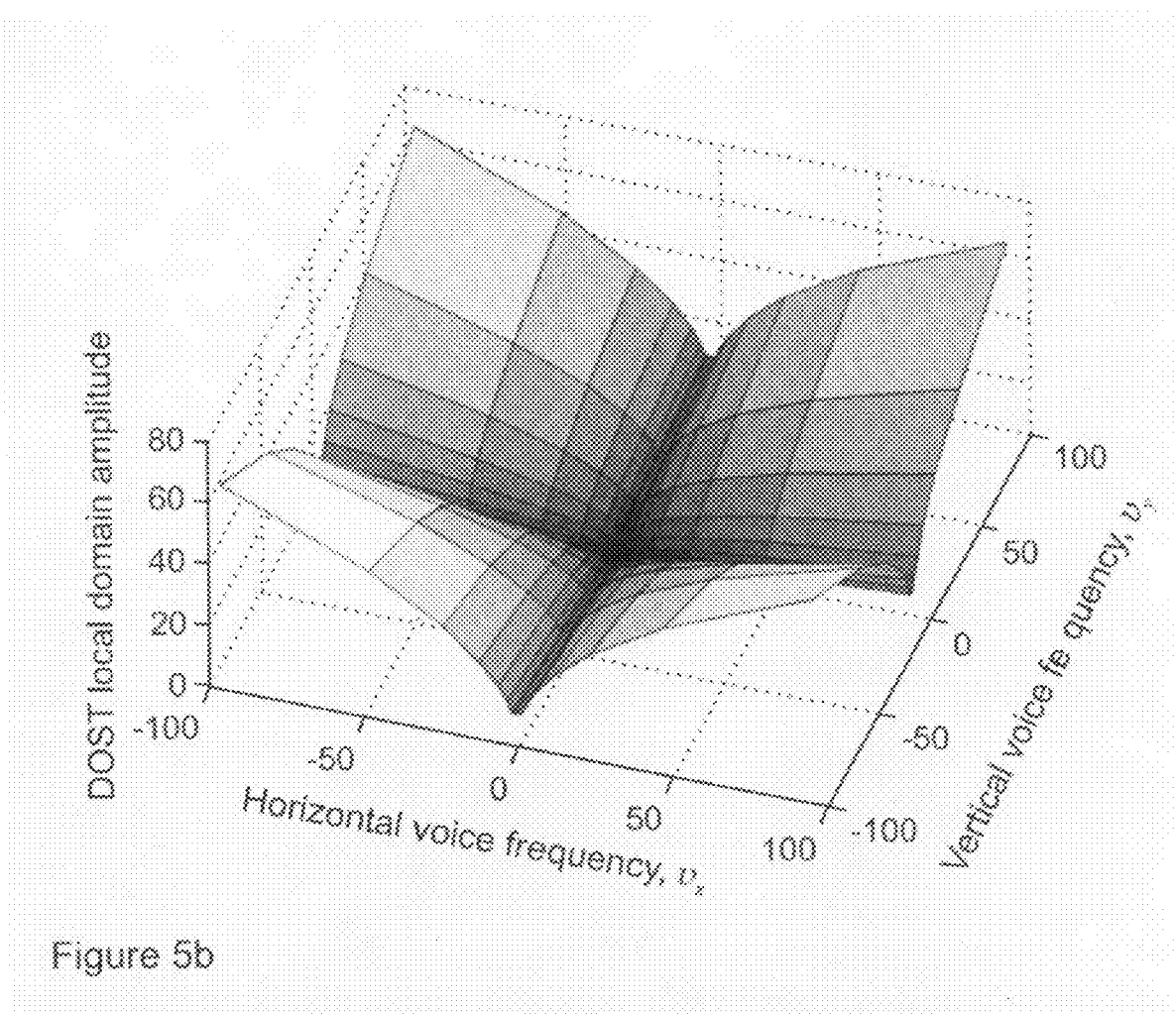
Figure 6A:
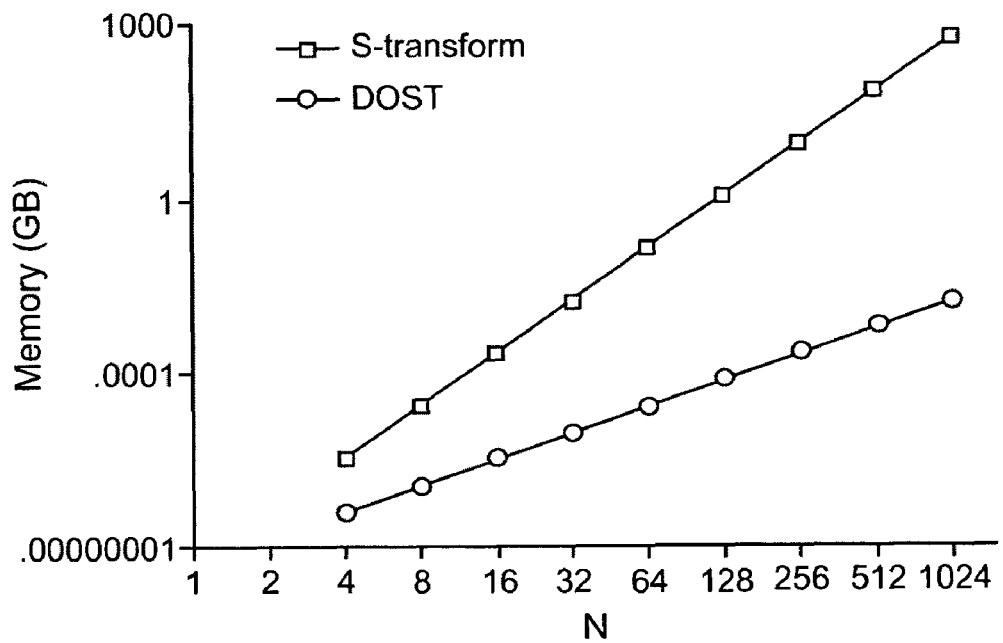
FIGS. 6a and 6b are diagrams illustrating a performance comparison of the discrete orthonormal Stockwell transform used in the method of texture characterization according to embodiments of the invention with the Stockwell transform; and, FIGS. 7a and 7b are diagrams illustrating signal-to-noise ratios of a main peak in the discrete orthonormal Stockwell transform obtained using the method of texture characterization according to embodiments of the invention with the Stockwell transform.
Figure 6B:
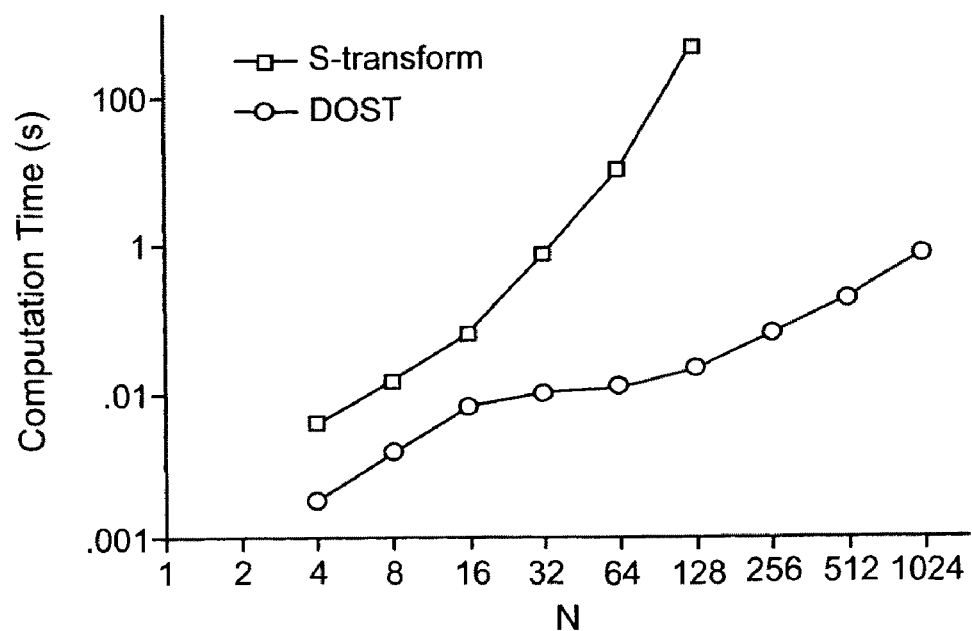

The 2D-DOST of the delta function, and the local frequency domain of the pixels at location (128,128) are shown in FIGS. 5a and 5b, respectively. FIG. 5b illustrates the square root increase in DOST amplitude with increasing frequency. The $L_1$ difference between the inverted and original images was close to machine epsilon—mean=$8.45 \times 10^{-14}$, median=$6.74 \times 10^{-14}$. FIGS. 6a and 6b illustrate the reduction in memory and computation time for the DOST, as compared to the ST for square images of size N×N. For example, calculation of the ST of a 128×128 image lasted approximately 8 minutes and used 1 GB of memory while calculation of the DOST lasted only 0.02 s and used 65 kB of memory.

Figure 7A:
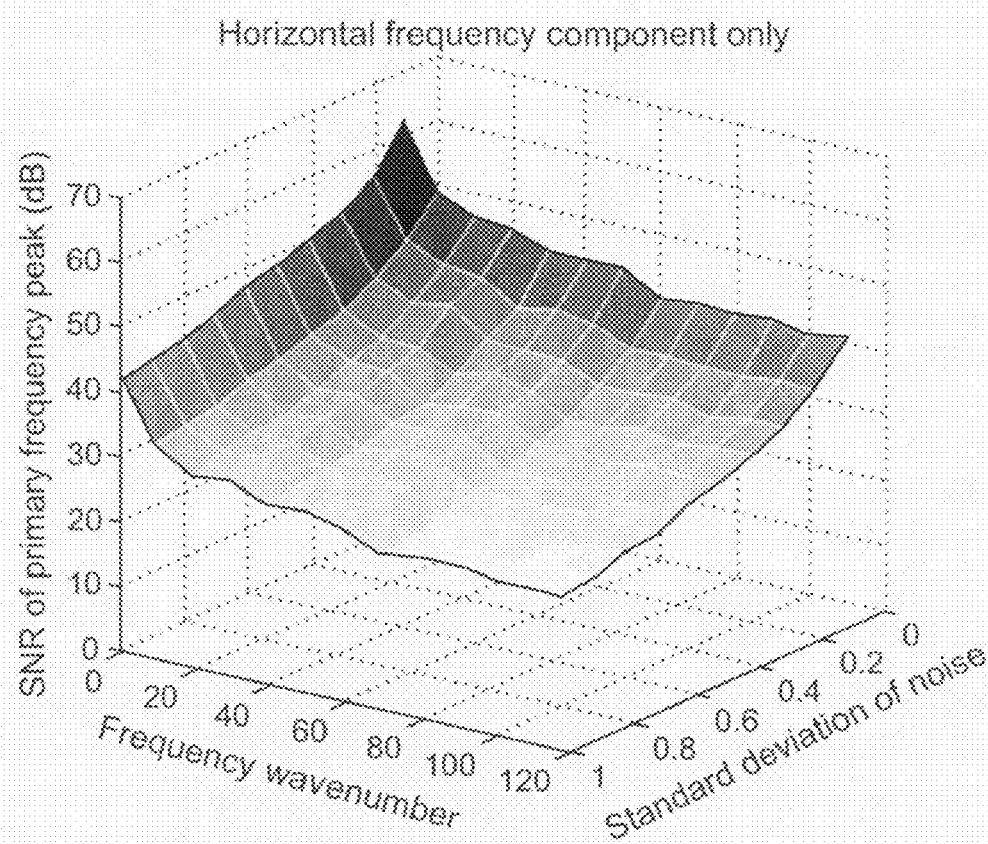
Figure 7B:
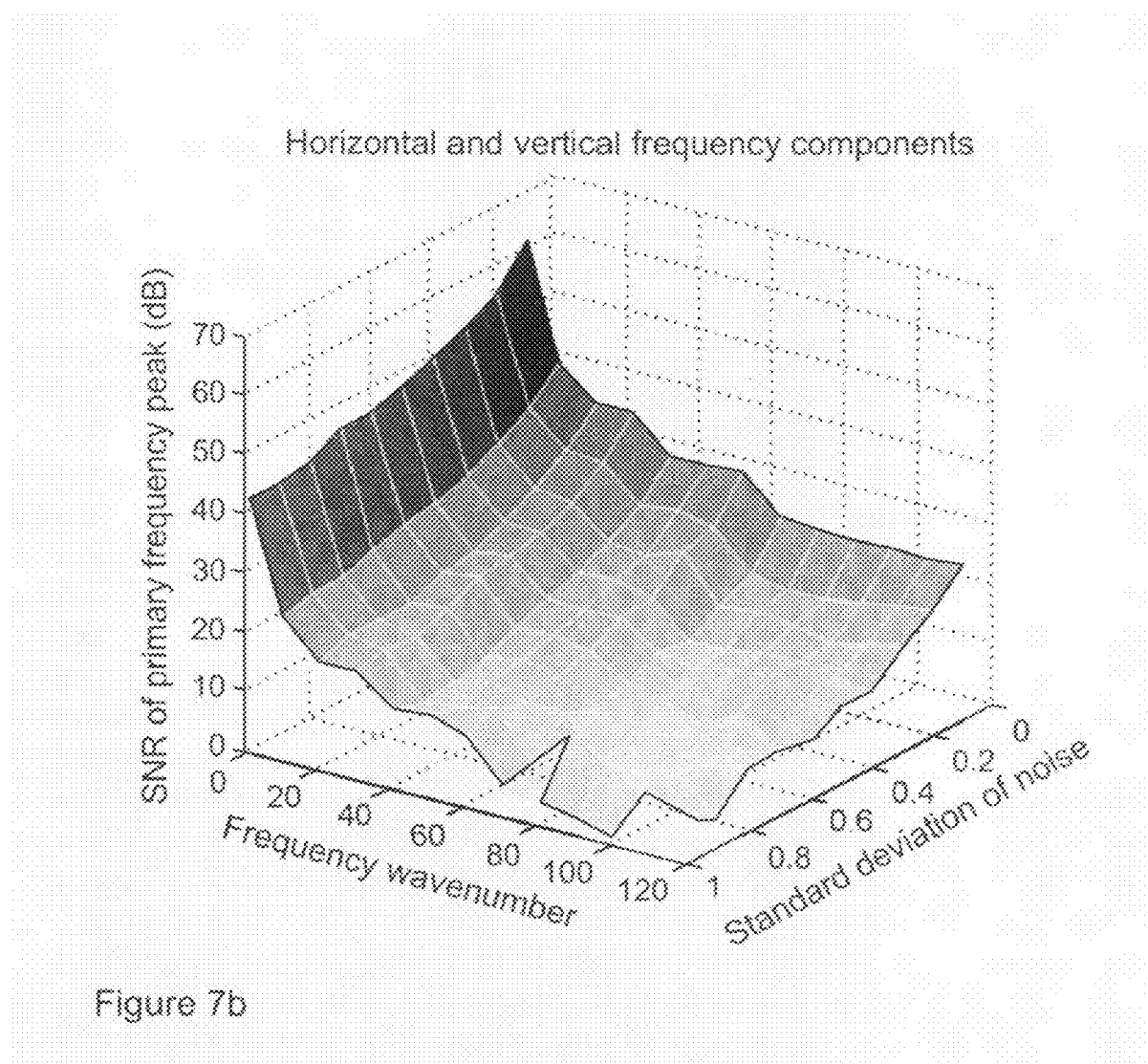

The SNR of the main DOST peak was inversely proportional to frequency and noise, as shown in FIGS. 7a and 7b. The SNR of the main peak drops more quickly with increasing noise and increasing frequency when there are horizontal and vertical frequency components, as shown in FIG. 7b, than when only one component is present, as shown in FIG. 7b. The misclassification rate for all horizontally-oriented frequencies was zero. The diagonally-oriented frequencies had a zero misclassification rate for all cases of σ<0.4 and for all frequencies less than 70, as shown in Table 1.

TABLE 1

| | Standard deviation of Gaussian noise (σ) | | | | | | | | | | | |
|---|---|---|---|---|---|---|---|---|---|---|---|---|
| frequency (diagonal) | 0.0 | 0.1 | 0.2 | 0.3 | 0.4 | 0.5 | 0.6 | 0.7 | 0.8 | 0.9 | 1.0 | total |
| 1 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 |
| 30 | 0 | 0 | 0 | 0 | 0 | 0 | 0 | 0 | 0 | 0 | 0 | 0 |

TABLE 1-continued

| frequency (diagonal) | Standard deviation of Gaussian noise (σ) | | | | | | | | | | | total |
|---|---|---|---|---|---|---|---|---|---|---|---|---|
| | 0.0 | 0.1 | 0.2 | 0.3 | 0.4 | 0.5 | 0.6 | 0.7 | 0.8 | 0.9 | 1.0 | |
| 40 | 0 | 0 | 0 | 0 | 0 | 0 | 0 | 0 | 0 | 0 | 0 | 0 |
| 50 | 0 | 0 | 0 | 0 | 0 | 0 | 0 | 0 | 0 | 0 | 0 | 0 |
| 60 | 0 | 0 | 0 | 0 | 0 | 0 | 0 | 0 | 0 | 0 | 0 | 0 |
| 70 | 0 | 0 | 0 | 0 | 0 | 0 | 36 | 32 | 43 | 35 | 62 | 208 |
| 80 | 0 | 0 | 0 | 0 | 4 | 0 | 0 | 6 | 70 | 55 | 61 | 196 |
| 90 | 0 | 0 | 0 | 0 | 0 | 0 | 0 | 14 | 34 | 31 | 64 | 143 |
| 100 | 0 | 0 | 0 | 0 | 0 | 0 | 0 | 18 | 42 | 91 | 70 | 221 |
| 110 | 0 | 0 | 0 | 0 | 0 | 0 | 8 | 75 | 33 | 87 | 87 | 290 |
| 120 | 0 | 0 | 0 | 0 | 0 | 0 | 8 | 41 | 13 | 13 | 24 | 99 |
| total | 0 | 0 | 0 | 0 | 4 | 0 | 52 | 186 | 235 | 312 | 386 | 1157 |

The classification accuracy using the DOST was higher than that of the invariant wavelet transform for each case investigated, as shown in Table 2.

TABLE 2

| Method | Number of features | Classifier | Train, test on 0° (%) | Train on rotated, test on 0° (%) | Train & test on all angles (%) |
|---|---|---|---|---|---|
| Invariant DOST | 21 | linear | 91.7 | 91.1 | 86.2 |
| | | quadratic | 91.7 | 94.7 | 88.0 |
| Invariant wavelet | 6 | linear | 83.3 | 84.9 | 83.1 |
| | | quadratic | 77.8 | 84.4 | 86.7 |

In the DOST applied for the above analysis rectangular windows and dyadic sampling have been used. Alternatively, other windows such as, for example, apodizing windows, and other sampling methods such as, for example, oversampling are employed.

The present invention has been described herein with regard to preferred embodiments. However, it will be obvious to persons skilled in the art that a number of variations and modifications can be made without departing from the scope of the invention as described herein.

What is claimed is:

1. A method comprising:
receiving multi-dimensional image data indicative of an image of an object;
determining multi-dimensional spectrum data by transforming the multi-dimensional image data into Fourier domain;
partitioning the multi-dimensional spectrum data into a plurality of partitions, wherein each partition is associated with a predetermined set of orthogonal voice frequencies; determining discrete orthonormal Stockwell transform data by transforming the partitioned multi-dimensional spectrum data into Stockwell domain, wherein the discrete orthonormal Stockwell transform data are determined by multiplying the partitioned multi-dimensional spectrum data by a square root of a number of points in the respective partition and by performing an inverse Fourier transform;
determining data associated with image texture in dependence upon the discrete orthonormal Stockwell transform data, the data associated with image texture being indicative of a feature of the object; and,
providing the data associated with image texture.

2. A method as defined in claim 1 wherein the multi-dimensional spectrum data are partitioned into non-overlapping partitions.

3. A method as defined in claim 2 wherein the multi-dimensional spectrum data are partitioned using dyadic sampling.

4. A method as defined in claim 1 wherein the multi-dimensional image data set is a two dimensional image data set.

5. A method as defined in claim 1 wherein the multi-dimensional image data set is indicative of a medical image.

6. A method as defined in claim 1 comprising: determining voice image data in dependence upon frequency information in a predetermined band in dependence upon the discrete orthonormal Stockwell transform data corresponding to a respective partition.

7. A method as defined in claim 6 wherein the voice image data are determined by inverse Fourier transforming the discrete orthonormal Stockwell transform data corresponding to a respective partition.

8. A method as defined in claim 1 comprising: determining spectrum data indicative of a spectrum of the image in dependence upon the discrete orthonormal Stockwell transform data corresponding to the plurality of partitions.

9. A method as defined in claim 8 wherein the spectrum data are determined by Fourier transforming the discrete orthonormal Stockwell transform data corresponding to the plurality of partitions.

10. A method as defined in claim 8 comprising: determining image data in space domain by inverse Fourier transforming the spectrum data.

11. A method as defined in claim 1 comprising: determining spectrum data indicative of a spectrum of the image by Fourier transforming the discrete orthonormal Stockwell transform data corresponding to pre-selected partitions of the plurality of partitions; and, determining image data in space domain by inverse Fourier transforming the spectrum data.

12. A method as defined in claim 1 comprising: determining local spatial frequency domain data in dependence upon the discrete orthonormal Stockwell transform data.

13. A method as defined in claim 1 comprising: determining local spectrum data for one of a predetermined location and region within the image in dependence upon the discrete orthonormal Stockwell transform data.

14. A method as defined in claim 13 comprising: determining primary frequency data in dependence upon the local spectrum data.

15. A method as defined in claim 1 comprising: determining complex image data in dependence upon the discrete orthonormal Stockwell transform data.

16. A method as defined in claim 15 comprising: determining magnitude image data in dependence upon the complex image data.

17. A method as defined in claim 15 comprising: determining phase image data in dependence upon the complex image data.

18. A method as defined in claim 1 comprising: determining rotationally invariant image texture data in dependence upon the discrete orthonormal Stockwell transform data.

19. A method as defined in claim 1 comprising generating visual display data in dependence upon the data associated with image texture for displaying in a human comprehensible form; and displaying the visual display data.

20. A non-transitory storage medium having stored therein executable commands for execution on a processor, the processor when executing the commands performing:
    receiving multi-dimensional image data indicative of an image of an object;
    determining multi-dimensional spectrum data by transforming the multi-dimensional image data into Fourier domain;
    partitioning the multi-dimensional spectrum data into a plurality of partitions, wherein each partition is associated with a predetermined set of orthogonal voice frequencies; determining discrete orthonormal Stockwell transform data by transforming the partitioned multi-dimensional spectrum data into Stockwell domain, wherein the discrete orthonormal Stockwell transform data are determined by multiplying the partitioned multi-dimensional spectrum data by a square root of a number of points in the respective partition and by performing an inverse Fourier transform;
    determining data associated with image texture in dependence upon the discrete orthonormal Stockwell transform data, the data associated with image texture being indicative of a feature of the object; and,
    providing the data associated with image texture.

21. A non-transitory storage medium having stored therein executable commands for execution on a processor as defined in claim 20, the processor when executing the commands performing: determining voice image data in dependence upon frequency information in a predetermined band in dependence upon the discrete orthonormal Stockwell transform data corresponding to a respective partition.

22. A non-transitory storage medium having stored therein executable commands for execution on a processor as defined in claim 20, the processor when executing the commands performing: determining spectrum data indicative of a spectrum of the image in dependence upon the discrete orthonormal Stockwell transform data corresponding to the plurality of partitions.

23. A non-transitory storage medium having stored therein executable commands for execution on a processor as defined in claim 20, the processor when executing the commands performing: determining local spectrum data for one of a predetermined location and region within the image in dependence upon the discrete orthonormal Stockwell transform data.

24. A non-transitory storage medium having stored therein executable commands for execution on a processor as defined in claim 20, the processor when executing the commands performing: determining complex image data in dependence upon the discrete orthonormal Stockwell transform data; determining magnitude image data in dependence upon the complex image data; and, determining phase image data in dependence upon the complex image data.

25. A non-transitory storage medium having stored therein executable commands for execution on a processor as defined in claim 20, the processor when executing the commands performing: determining rotationally invariant image texture data in dependence upon the discrete orthonormal Stockwell transform data.

26. A method comprising:
    receiving multi-dimensional image data indicative of an image of an object;
    determining multi-dimensional spectrum data by transforming the multi-dimensional image data into Fourier domain;
    partitioning the multi-dimensional spectrum data into a plurality of non-overlapping partitions using dyadic sampling, wherein each partition is associated with a predetermined set of orthogonal voice frequencies; determining discrete orthonormal Stockwell transform data by transforming the partitioned multi-dimensional spectrum data into Stockwell domain;
    determining data associated with image texture in dependence upon the discrete orthonormal Stockwell transform data, the data associated with image texture being indicative of a feature of the object; and,
    providing the data associated with image texture.

27. A non-transitory storage medium having stored therein executable commands for execution on a processor, the processor when executing the commands performing:
    receiving multi-dimensional image data indicative of an image of an object;
    determining multi-dimensional spectrum data by transforming the multi-dimensional image data into Fourier domain;
    partitioning the multi-dimensional spectrum data into a plurality of non-overlapping partitions using dyadic sampling, wherein each partition is associated with a predetermined set of orthogonal voice frequencies; determining discrete orthonormal Stockwell transform data by transforming the partitioned multi-dimensional spectrum data into Stockwell domain;
    determining data associated with image texture in dependence upon the discrete orthonormal Stockwell transform data, the data associated with image texture being indicative of a feature of the object; and,
    providing the data associated with image texture.

* * * * *